Patented Oct. 10, 1922.

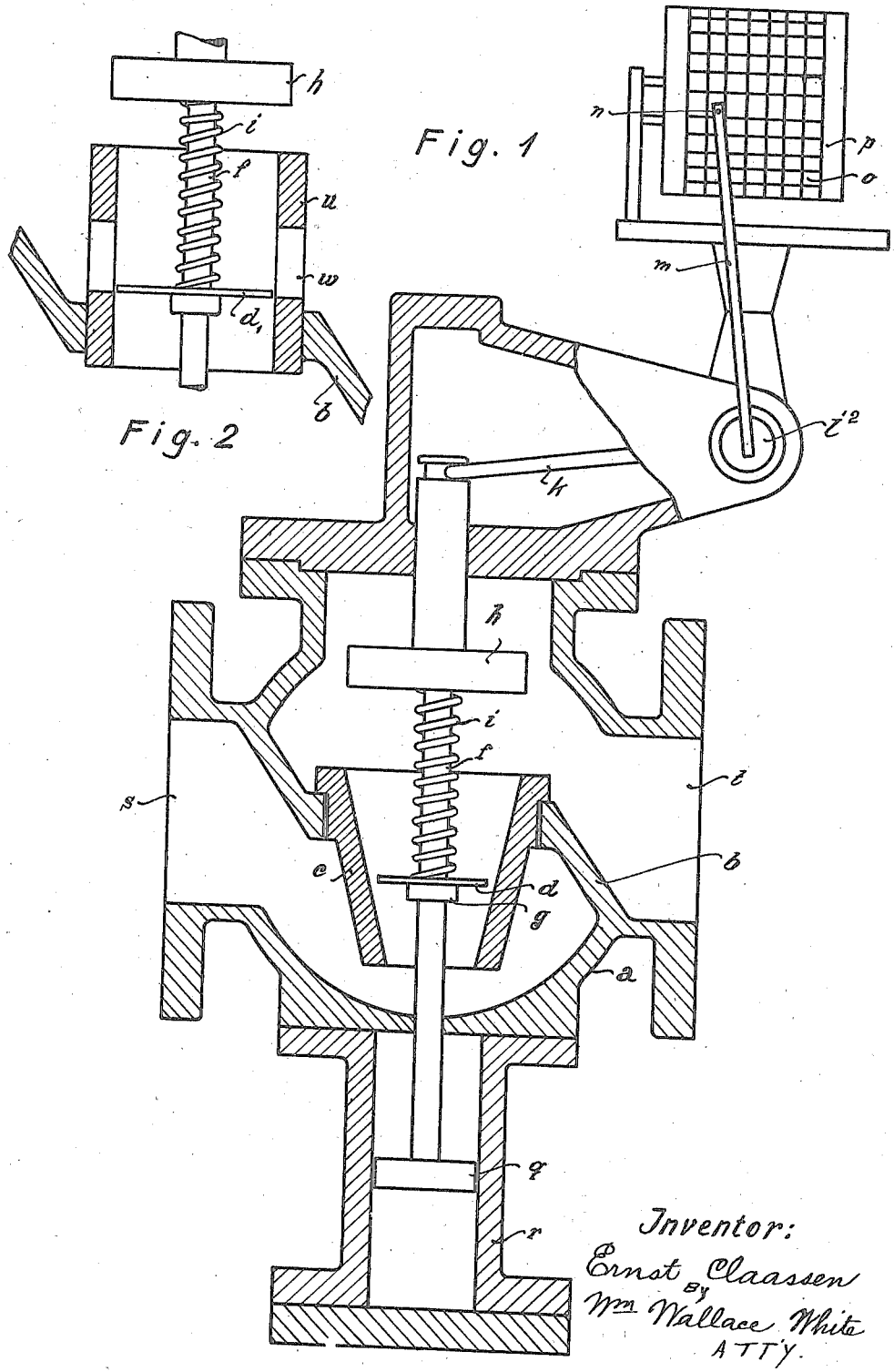

1,431,511

UNITED STATES PATENT OFFICE.

ERNST CLAASSEN, OF LICHTERFELDE-OST, NEAR BERLIN, GERMANY.

FLUID METER.

Application filed December 24, 1920. Serial No. 433,005.

(GRANTED UNDER THE PROVISIONS OF THE ACT OF MARCH 3, 1921, 41 STAT. L., 1313.)

*To all whom it may concern:*

Be it known that I, ERNST CLAASSEN, citizen of the German Republic, residing at Lichterfelde-Ost, near Berlin, Germany, have invented certain new and useful Improvements in Fluid Meters (on which applicant has obtained German patents under date of September 3, 1920, and November 15, 1920), of which the following is a specification.

This invention relates to fluid meters of the float type, the object of the invention being to provide a recording meter by means of which a more accurate record is produced than was heretofore possible.

As is well known the usual float meter comprises essentially a weight rigidly connected to a measuring disk both slidably arranged within a chamber or nozzle in order to close the passage of fluid or to open the passage more or less. Because of the rigid connection of the disk and weight, the latter is obliged to move with the disk, thereby to assume positions corresponding to the actual steam consumption, and, owing to the momentum attained during such motion, the weight is carried beyond such positions, and necessarily carries the disk along with it. Consequently, the resulting record does not present an accurate indication of the actual maximum volume of fluid passing through the meter. Furthermore, the oscillating movements of the disk and weight will record a band of considerable width, and it is a matter of guesswork to determine which part of the band represents the actual volume of fluid.

The object of the present invention is to overcome the disadvantages above referred to, by a cheap and safely working arrangement. For this purpose in such a fluid meter the weight and a disk of light weight are arranged in slidable relation to each other with a spring between said weight and disk, the initial tension of said spring corresponding approximately to the force of the weight. For producing and maintaining the said tension, the sliding movement of the disk away from the weight is limited by suitable means.

In the drawings accompanying and forming part of this specification:

Fig. 1 is a vertical central section of a meter constructed in accordance with the present invention; and Fig. 2 is a fragmentary vertical section of a modified form thereof.

The same characters of reference designate the same parts in the different figures of the drawings.

Referring to the drawings, $a$ designates a casing which is divided by a partition $b$ into a pair of chambers, one communicating with an inlet opening $s$ and the other with an outlet opening $t$. The partition $b$ is provided centrally thereof with an opening forming a seat for a conical nozzle $c$, within which is adapted to reciprocate a disk $d$, which is made as light as possible so that the disk is practically without inertia. The disk $d$ is mounted for sliding movement on a spindle $f$, which is vertically movable in openings in the upper and lower walls of the casing $a$, a collar $g$ being secured to the spindle $f$ below the disk for limiting the downward movement of the latter. Rigidly secured to the spindle at some distance above the disk is a load-weight $h$, and between said weight and the disk $d$ is disposed a coiled spring $i$ encircling the spindle $f$, the tension of said spring being initially such that it corresponds approximately to the weight of the load $h$. The spindle $f$ is provided at its upper end with a circumferential groove which is engaged by the bifurcated end of a lever $k$, which is pivoted at $i^2$ in the casing $a$ and has rigidly secured thereto a pointer $m$ carrying a pencil $n$ at its free end disposed so as to travel over the surface of a record sheet $o$ secured around the circumference of a rotatable drum $p$, which may be driven by suitable clockwork (not shown). It will thus be seen that any vertical movement imparted to the spindle $f$ will, by means of the rock lever $k$, cause a record to be made by the pencil $n$ on the sheet $o$. Below the casing $a$ is a cylinder $r$ in axial alinement with the spindle $f$ which latter is provided at its lower end with a piston $q$ adapted to reciprocate within said cylinder, so that by filling the cylinder with a suitable liquid the piston $q$ will act in the nature of a brake for cushioning the vertical movements of the spindle.

The operation of the device is as follows: Upon the admission of a fluid, such, for instance, as steam, into the casing through the inlet opening s, the disk d will throttle the nozzle c so that there will be a difference in pressure on opposite sides of the disk, whereby the disk will be lifted more or less, depending on the force of the steam, and when sufficient force is exerted by the fluid, the disk will be raised against the tension of the spring thereby compressing the latter against the weight h and causing the spindle f, together with said weight, to move upwards, whereupon said movement will be recorded by the pencil n on the sheet o, in a manner which will be readily understood.

If, however, the steam pressure varies suddenly, it will be obvious that such variation will, owing to the cushioning effect of the spring, at first produce a movement only of the disk d, which movement will be slowly transmitted by the spring to the load h. Consequently, if a number of such fluctuations follow each other in rapid succession, the load h will, owing to the tension of the spring, assume a mean position corresponding to the mean fluid pressure in the chamber of the meter, the inertia of the load preventing it from immediately following the rapid movements of the disk, and, therefore, the pencil n will record only the mean fluid pressure during such fluctuations.

In Figure 2, I have shown a nozzle u slotted at diametrically opposite points, as shown at w, in place of the conical nozzle c of Fig. 1. In this form of the device, the disk d when acted on by the fluid pressure, will be moved upward so as to expose a longer or shorter portion of the slots w for the passage of the fluid. The operation of this device is otherwise identical with that shown in Fig. 1.

From the foregoing it will be seen that I have provided a structure in which there is no rigid connection between the weight required for producing the difference in pressure and the disk, whereby the latter is left free to follow the fluctuations of the actual fluid pressure. The disk, as hereinbefore stated, is extremely light in weight, and therefore will not be carried beyond a position corresponding to the actual fluid pressure by reason of any momentum acquired during its movement, and since it is slidable relatively to the weight or load h, the momentum acquired by such load will be without effect on the disk, but will be absorbed by the spring i. At the same time, the desired difference in pressures above and below the disk will be obtained because of the fact that the initial tension of the spring acting on the disk corresponds approximately to the weight of the load h.

While I have described in detail the structure herein illustrated, it is to be understood that I do not thereby limit my invention to the precise features of construction shown, as I am aware that many mechanical changes and modifications may be made therein without departing from the spirit and scope of the claims appended hereto.

Having thus described my invention, what I claim is:

1. In a fluid meter, the combination of a chamber, a disk movable within said chamber under the action of a fluid passing therethrough, a weight disposed within the chamber, means for connecting the weight and disk in slidable relation to each other, a spring between said weight and disk, the initial tension of said spring corresponding approximately to the force of the weight, and means for limiting the sliding movement of the disk away from the weight.

2. In a fluid meter, the combination of a chamber having an inlet opening and an outlet opening, a nozzle within said chamber between said openings, a disk normally closing said nozzle and adapted to be moved under the action of fluids passing through the chamber, a weight in said chamber, means for connecting the disk and weight in slidable relation to each other, and means between said disk and weight for transmitting motion from the disk to the weight.

3. In a fluid meter, the combination of a chamber having an inlet opening and an outlet opening, a nozzle within said chamber between said openings, a disk normally closing said nozzle and adapted to be moved under the action of fluids passing through the chamber, a weight in said chamber, means for connecting the disk and weight in slidable relation to each other, and means between said disk and weight for absorbing the effect of the momentum of said weight before it reaches the disk.

4. In a fluid meter, the combination of a chamber, a member movable in said chamber under the action of a fluid passing therethrough, a weight disposed within said chamber, tension means between said movable member and weight for transmitting the motion of said member to said weight, and brake mechanism for cushioning the return movement of said weight.

In testimony whereof I affix my signature.

ERNST CLAASSEN